Dec. 22, 1936.    E. D. DOYLE ET AL    2,065,365
MEASURING SYSTEM
Filed Oct. 29, 1934    2 Sheets-Sheet 1
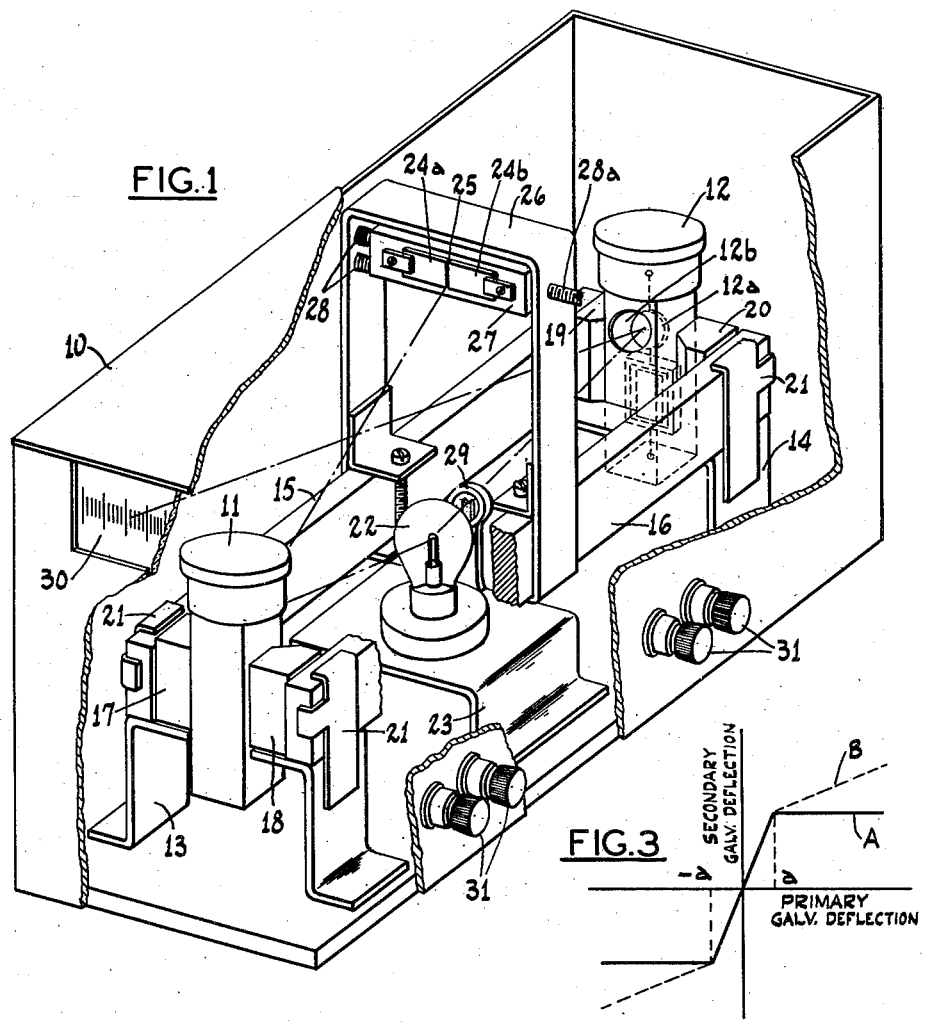
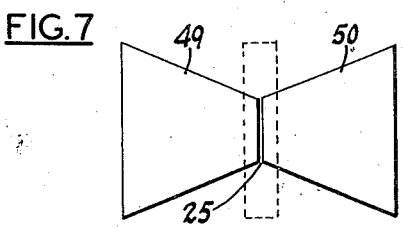
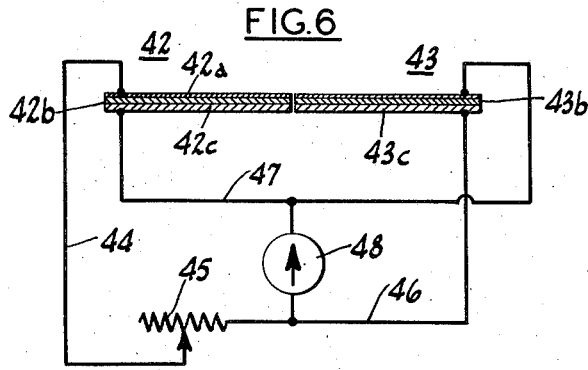
INVENTORS
Edgar D. Doyle and
BY  Paul H. Dike
Cornelius D. Ehret
ATTORNEY.

Dec. 22, 1936.     E. D. DOYLE ET AL     2,065,365
MEASURING SYSTEM
Filed Oct. 29, 1934     2 Sheets-Sheet 2
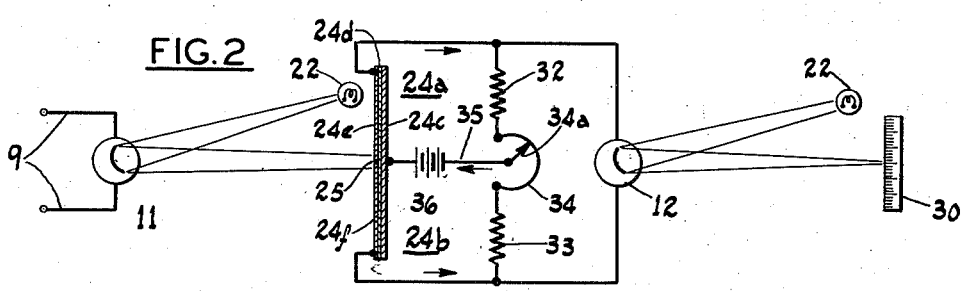
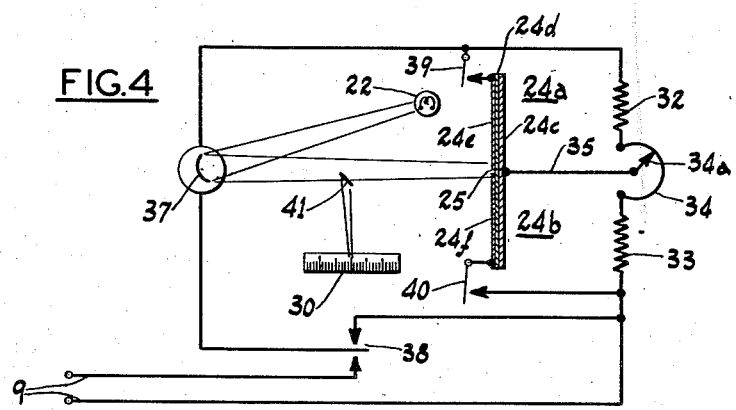
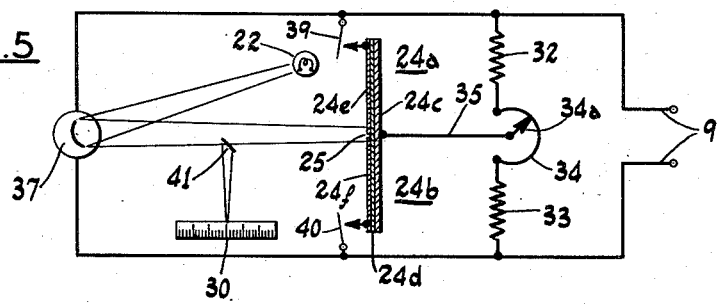
INVENTORS
Edgar D. Doyle and
BY   Paul H. Dike
Cornelius L. Ehret
ATTORNEY.

Patented Dec. 22, 1936

2,065,365

UNITED STATES PATENT OFFICE 2,065,365

MEASURING SYSTEM

Edgar D. Doyle and Paul H. Dike, Philadelphia, Pa., assignors to Leeds & Northrup Company, Philadelphia, Pa., a corporation of Pennsylvania Application October 29, 1934, Serial No. 750,520

6 Claims. (Cl. 250—41.5)

Our invention relates to measuring systems which, while of general application, are particularly useful in measuring, with an extremely high degree of accuracy, the departure of a measuring instrument from zero or neutral position, such a measurement being particularly important when employing the null method; that is, the method in which the measuring instrument is always restored to zero or balanced position and the measurement obtained from the movement or deflection of associated rebalancing or calibrating apparatus. By the term "measuring", as used hereinafter, is meant any form of measuring, indicating, controlling or the like, involving any derived indication of a primary condition.

In accordance with our invention, a pair of photo-sensitive elements having asymmetrical conductivity characteristics are differentially illuminated in accordance with the deflection of a member movable in response to the condition to be measured. The photo-sensitive devices are included in a measuring circuit with such a polarity that the flow of current therethrough is always in the direction of their lower conductivity, irrespective of the sense of the differential illumination thereof. In the preferred embodiment, we employ photo-electric generating devices; that is, devices which produce a photo-electromotive force in response to illumination, as contrasted with those devices which merely vary in impedance with variations in illumination. Such photo-electric generating devices are included in an impedance network with such a polarity that the current flowing therethrough is always in the direction of their lower conductivity. The impedance network preferably comprises a four-arm network connected similarly to a Wheatstone bridge, and, for the sake of brevity, such a network will be referred to hereinafter simply as a bridge circuit. A low resistance connection is made across one of the conjugate axes of the bridge, while the system includes a measuring circuit energized across the other axis of the bridge. This latter measuring circuit includes a measuring instrument which may be the same as that energized in accordance with the primary condition and controlling the differential illumination of the photo-sensitive devices, thus constituting a regenerative system, or it may comprise an additional measuring instrument independent of that responsive to the primary condition, thus comprising a concatenated system. In this latter case, the instrument responsive to the primary condition may be either one adapted for use with alternating current or one for direct current.

In accordance with another feature of our invention, the sensitivity of the system is increased, without increasing the range of the secondary measuring instrument, by disposing the photo-sensitive devices closely adjacent each other and differentially illuminating the devices with a narrow beam of light normally bisected by the spacing of the photo-sensitive elements, whereby the differential illumination of the devices varies only during the travel of the beam through a distance on each side of neutral equal substantially to one-half the width of the beam. In accordance with another feature of our invention, the effective width of the photo-sensitive devices may increase progressively from their adjacent edges, which causes the differential illumination of the devices to vary at one rate while the beam is moving across the space separating the elements, and at another rate when the beam is moving across either one of the elements singly.

For a better understanding of our invention, together with other and further features thereof, reference is had to the following description taken in connection with the accompanying drawings and its scope will be pointed out in the appended claims.

In the drawings, Fig. 1 is a perspective view, partly broken away, of a measuring system embodying our invention;

Fig. 2 is a schematic circuit diagram of the apparatus of Fig. 1;

Fig. 3 is a graph of certain operating characteristics of the system of Figs. 1 and 2;

Figs. 4, 5 and 6 illustrate modified circuit arrangements of systems embodying our invention; while Fig. 7 is a detail view of a modified form of photo-sensitive elements suitable for use in connection with our invention.

Referring now more particularly to Fig. 1 of the drawings, our invention is illustrated as embodied in an apparatus comprising a casing 10 in which are mounted a primary measuring instrument or galvanometer 11 and a secondary measuring instrument or galvanometer 12 supported therein from the brackets or standards 13 and 14, respectively. The galvanometers 11 and 12 may be completely independent or, as illustrated, they may have common permanent bar magnets 15 and 16, the galvanometer 11 having pole pieces 17 and 18 projecting from the magnets 15 and 16, respectively, and the galvanometer 12 similarly having pole pieces 19 and 20. If desired, clips 21 may be provided for securing the magnets 15 and 16 in proper relation. The galvanometer 11 is provided with a deflecting mirror (not shown) disposed to receive light from a source 22 supported in the casing on the bracket 23. An image of the light source 22 is projected upon a pair of photo-sensitive elements 24a, 24b, by a focusing system including the mirror of the galvanometer 11. The photo-sensitive elements 24a, 24b are closely adjacent, the space separating them being substantially narrower than the width of the image of the light source which, as stated above, preferably comprises a narrow light beam. The elements 24a, 24b are supported in a yoke 26 by a member 27 adjustable, as by springs 28 and a screw 28a, the latter preferably projecting through the casing 10.

The photo-sensitive elements 24a, 24b may be any of the several types well-known in the art, although we prefer to use photo-voltaic cells or photo-electric generating devices; that is, devices which produce a photo-electromotive force variable in accordance with variations in illumination to which they are subjected. Well-known commercially available devices of this type comprise a layer of photo-sensitive substance on a conductive backing or base plate; for example, cuprous oxide on copper or selenium or a selenium compound on iron; and a superimposed translucent layer of conductive material to form the other electrical terminal, for example, an extremely thin layer of sputtered or sprayed conductive metal. Devices of this type are marketed under the term "Photronic cells." The devices 24a, 24b may be completely independent or, as illustrated, they may be formed on a common backing plate 24c (Fig. 2), with a common photo-sensitive layer 24d and completely independent conductive layers 24e and 24f isolated from each other by scratching or otherwise removing a portion of the translucent conductive material, thereby forming the space 25 effectively separating the elements 24a and 24b.

Commercially available photo-electric generators of the type just described have a much higher conductivity to the flow of current in one direction than in the other; the ratio varying from 5:1 to 200:1 in accordance with the type and quality of the device, the ratio tending to increase with quality.

The galvanometer 12 may be of the type provided with a deflecting needle or, as illustrated, of the type including a deflecting mirror 12a which receives a beam of light from the source 22 through a suitable lens or focusing device 29, and reflects the beam upon a translucent scale 30 supported in the casing 10. If desired, a plurality of terminals 31 may be secured to the casing 10 for making electrical connections to the apparatus contained therein.

A preferred circuit arrangement of the apparatus of Fig. 1 is diagrammatically shown in Fig. 2 in which corresponding elements are identified by the same reference characters. The galvanometer 11 is connected to be energized from an input circuit 9, subjected to an electrical quantity which is a measure of the primary condition, and is disposed to reflect a beam of light from the source 22 to illuminate differentially the photo-sensitive elements 24a and 24b. As shown, the photo-sensitive devices 24a, 24b comprise a conjugate arm of a bridge circuit, the other arm of which consists of fixed resistors 32 and 33 interconnected by a slidewire or resistor 34 having an adjustable contact 34a. The junction of the photo-sensitive devices 24a and 24b is interconnected with the adjustable contact 34a through a low resistance connection 35 constituting one of the conjugate axes of the bridge. As shown, the conductor 35 includes an auxiliary battery 36, although, in many cases, this may be omitted. The other conjugate axis of the bridge is connected to the galvanometer 12.

In explaining the operation of the above-described system, it will be assumed that the beam of the galvanometer 11 will be brought to zero position when the input circuit 9 is deenergized, either by adjustments of the galvanometer per se or by adjusting the carriage 27 carrying the photo-sensitive elements 24a, 24b by means of the screw 28a. Thereupon, the contact 34a is adjusted to bring the beam of the galvanometer 12 to zero reading on the scale 30. If the galvanometer 11 is now energized with an electromotive force which is a measure of a primary condition, the beam of light will deflect from the neutral position, in which it is substantially bisected by the space 25, increasing the illumination of one of the photo-electric generators 24a, 24b and decreasing that of the other. This will produce an unbalance in the photo-electric currents flowing in resistors 32 and 33, which results in a resultant voltage across the axis of the bridge connected to the galvanometer 12. The galvanometer 12 will deflect through an angle which, for small deflections of the galvanometer 11, is a high amplification of the deflection of the galvanometer 11, and this amplified deflection will be indicated on the scale 30.

By referring to the solid line curve A of Fig. 3, representing a characteristic of the system of Fig. 2, it will be seen that, as the beam controlled by the galvanometer 11 deflects through the distance plus or minus a, corresponding substantially to half the width of the image, the rate of change of the unbalance voltage of the bridge is very rapid, indicating a very high sensitivity in this range. Thereafter, the beam moves across one or the other of the devices 24a or 24b singly, the total illumination of which remains unchanged, as indicated by the curve A extending beyond the points plus or minus a. If it were not for this latter feature, any galvanometer 12 having a high enough sensitivity for amplifying deflections of the galvanometer 11 within a limited region on each side of its zero would be thrown violently off scale for normal deflections of the galvanometer 11. Such excessive deflections of the galvanometer 12 not only would tend to make operation of the system more difficult, as it would not be readily apparent in which sense the galvanometer 12 had been deflected off scale, but also might tend to injure the instrument. By utilizing the above-described feature, however, a very high degree of amplification of deflection of the instrument 11, in the neighborhood of zero, is obtained without corresponding amplification of deflections of larger value.

As stated above, photo-electric generating devices of the type which we prefer are asymmetrical in their conductivity characteristics; that is, they present a very much higher impedance to flow of current in one direction than in the other. It has been found that most reliable results are obtained with devices of this type when they are connected to an external circuit whose resistance is substantially fixed and low relative to the internal resistance of the photo-voltaic device and with such polarity that the photo-electric currents therethrough always flow in the direction of their lower conductivity irrespective of their relative illumination. This result is procured in the circuit of Fig. 2 in which the currents flow, as indicated by the arrows, from the elements 24a, 24b through the resistors 32 and 33, respectively, and the common return conductor 35. The photo-electric currents do not flow directly through the galvanometer 12, but any unbalance in the photo-electric currents produces a resultant voltage across resistors 32, 33, 34 by which the galvanometer 12 is energized. With such circuit connections, also, the galvanometer 12 works into a circuit of approximately constant resistance, which is a highly desirable condition. Assuming, for example, that cell 24a becomes more brightly illuminated, substantially all of its output current flows through resistance 32, the upper part of resistance 34 to contact 34a, and thence through the return conductor 35. Of the small percentage of the output current of cell 24a which flows through the galvanometer practically all flows through resistance 33 because its resistance is low compared to the resistance of photo-cell 24b poled as aforesaid. The degree of illumination of cell 24 has, therefore, insubstantial effect upon the resistance of the output circuit of cell 24a. Furthermore, the galvanometer is always working into a circuit of low and substantially constant resistance, and hence has a good damping characteristic. The foregoing applies whether or not a battery is used in the low-resistance connection 35; if a battery is used it is so poled that the current flow is as shown. The sensitivity of the above-described apparatus may be varied within wide limits by varying the voltage applied to the light source 22.

While the above-described measuring system may be utilized in connection with any well-known measuring apparatus, it is particularly suitable for use in connection with an automatically rebalanced measuring circuit of the type disclosed in United States Letters Patent No. 1,935,732, granted November 21, 1933, upon the application of L. Y. Squibb. Referring particularly to Fig. 15 of that patent, the connections to the switch 52 correspond to the input circuit 9 of Fig. 2 of the drawings, while the galvanometer G corresponds to the galvanometer 12 of Fig. 2, in which case it is preferably provided with a pointer, as the pointer 16 of Squibb, rather than the light-deflecting mirror. It is similarly useful in connection with the automatic rebalancing measuring circuit shown in United States Letters Patent No. 1,332,182, granted February 24, 1920, upon the application of M. E. Leeds. For example, referring to Fig. 4 of that patent, the input circuit of the galvanometer 39 corresponds to the input circuit 9 of Fig. 2 of the drawings, while the galvanometer 39 with its pointer 42 corresponds to the galvanometer 12 of Fig. 2 of the instant application. It is equally suitable for use in connection with other well-known types of automatic rebalancing measuring apparatus.

Referring now to Fig. 4, there is shown a modification of the circuit arrangement of Fig. 2, in which the pair of galvanometers 11 and 12 are replaced by a single galvanometer 37. In this instance, the galvanometer 37 is connected across the output of the bridge, comprising the elements 24a, 24b and resistors 32, 33 and 34, in series with the main input circuit 9 through a two-position switch 38, when operated to close its lower contacts. It may be desirable also to include switches 39 and 40 in the connections to the photo-sensitive devices 24a and 24b. A reflecting device 41 may be disposed to intercept a portion of the beam of the galvanometer 37 and project it upon an indicating scale 30. In the operation of the system of Fig. 4, the switch 38 is first moved to close its upper contacts and the zero of the galvanometer 37 is adjusted, either by means of the galvanometer itself or by adjusting the elements 24a, 24b by means of the screw 28a (Fig. 1). The switches 39 and 40 are then closed and the contact 34a adjusted on the slidewire 34 to return the beam of the galvanometer to zero, in case there should be any deflection. Switch 38 is moved to close its lower contacts and the system is then in condition to make the desired measurements.

It will be seen that any energization of the input circuit 9 will cause a certain deflection of the galvanometer 37. This deflection will differentially illuminate the photo-sensitive elements 24a, 24b producing an unbalance of the photo-electric currents flowing in the bridge in which they are connected and a resultant voltage across resistors 32, 33, 34 cumulative with, and in series with, tha of the input circuit 9, thus constituting, in effect, a regenerative circuit. The voltage impressed upon the galvanometer 37 will thus continue to build up to a value dependent primarily upon the illumination of the light sensitive cells and their voltage characteristics thus indicating the direction but not the magnitude of the impressed voltage. The system of Fig. 4 is particularly suitable for use with low resistance input circuits, as the galvanometer 37 is directly in series with the input circuit, across the bridge including the photo-sensitive elements.

When utilizing a galvanometer with input circuits of relatively high resistance, the circuit connections of Fig. 5 are preferable. The system of Fig. 5 is, in all respects, similar to Fig. 4 with the exception that the input circuit is connected in parallel with the gavanometer, rather than in series therewith. The manner of operation is, in all respects, similar.

In Fig. 6 is shown diagrammatically a simplified circuit arrangement for utilizing the differential illumination of two independent photo-sensitive devices 42 and 43. One terminal plate 42a of the device 42 is connected through a conductor 44, an adjustable balancing resistor 45, and a conductor 46 to the back-plate 43c of the device 43, while the back-plate 42c of the device 42 is connected to the other terminal plate 43a of the device 43 through the conductor 47. As indicated by the drawings, the elements 42 and 43 are completely independent, provided with independent back-plates 42c and 43c and independent interposed photo-sensitive layers 42b and 43b, respectively. The galvanometer 48 is connected between the conductors 46 and 47. This system constitutes essentially two independent circuits including photo-sensitive devices having a common connection including the galvanometer 48, the connections being such that only the difference of the photo-electric currents flows through the galvanometer.

The circuit connections of Fig. 6 are such that the photo-electric currents always flow through both of the devices 42 and 43 in the direction of their lower conductivity, irrespective of the illumination thereof. The galvanometer 48 responds only to the difference of the photo-electric currents of the devices 42 and 43 and thus gives a measure of the primary condition. It will be understood, of course, that the circuit arrangement of Fig. 6 may be included in the measuring systems of any of Figs. 2, 4 and 5 in lieu of the bridge circuits, as shown therein.

In Fig. 7 is shown a modified form of photo-sensitive apparatus comprising two elements 49 and 50 provided with edges spaced parallel and closely adjacent, separated only by a small spacing 25. As indicated by dotted lines, the light beam is substantially wider than the spacing separating the photo-sensitive devices 49 and 50. The effective width of the elements 49 and 50 progressively increases from their adjacent edges, as by shaping the elements in the form illustrated in Fig. 7 or by providing them with masks of a similar shape. With such an arrangement, the unbalance voltage of the measuring system, caused by differential illumination of the devices 49 and 50 as the beam travels over the space separating them, has a very steep slope, as indicated by the solid line curve A between the limits plus and minus $a$. Beyond these limits, due to the increasing effective width of the elements 49 and 50, the differential illumination continues to increase but at a much lower rate, as represented by the dash curve B of Fig. 3. In this way, a highly sensitive indication of minor departures of the primary galvanometer from zero is obtained and, at the same time, a less sensitive indication of further deflections thereof is given, to aid in determining, at least approximately, the extent to which the measuring circuit in which the primary galvanometer is connected is unbalanced, thus facilitating a rebalance thereof.

While we have described what we at present consider the preferred embodiments of our invention, it will be obvious to those skilled in the art that various changes and modifications may be made without departing from our invention and we, therefore, aim in the appended claims to cover all such changes and modifications as fall within the true spirit and scope of our invention.

What we claim is:

1. A measuring system comprising a single electrical deflecting instrument, a relatively low resistance circuit connected to said instrument and including means responsive to a condition to be measured for energizing the same, a pair of photo-sensitive elements, means controlled by said instrument for differentially illuminating said photo-sensitive elements, and a bridge circuit including said photo-sensitive elements, said instrument being connected in series with said energizing circuit across said bridge circuit to impart to said system a regenerative characteristic.

2. A measuring system comprising a single electrical deflecting instrument of relatively high electrical resistance, a circuit connected to said instrument and including means responsive to a condition to be measured for energizing the same, a pair of photo-sensitive elements, means controlled by said instrument for differentially illuminating said photo-sensitive elements, and a bridge circuit including said photo-sensitive elements, the output of said bridge circuit being connected in parallel with the energizing circuit of said instrument to impart to said system a regenerative characteristic.

3. A measuring system comprising a single electrical deflecting instrument, a circuit connected to said instrument and including means responsive to a condition to be measured for energizing the same, a pair of photo-sensitive elements having asymmetric conductivity characteristics, means controlled by said instrument for differentially illuminating said photo-sensitive elements, a bridge circuit including said photo-sensitive elements connected with such polarity that the flow of current therethrough is always in the direction of their lower conductivity irrespective of the sense of the deflection of said instrument, and a low resistance connection across one of the conjugate axes of said bridge for carrying the currents flowing through said photo-sensitive elements, the other axis of said bridge being interconnected with the energizing circuit of said instrument to impart to said system a regenerative characteristic.

4. A measuring system comprising a pair of photo-sensitive elements disposed closely adjacent each other, the effective width of said elements increasing progressively from their adjacent edges, means for differentially illuminating said devices with a beam of light of a width which is small relative to the length of said elements but substantially greater than the spacing therebetween, means for deflecting said beam in response to a condition to be measured but only over a range substantially equal to the overall length of said pair of elements, and measuring means responsive to the differential illumination of said elements.

5. A regenerative measuring system comprising a pair of photo-voltaic cells, means for connecting one pair of like terminals of said cells, fixed resistance means connected between the other pair of terminals of said cells, an electrical deflecting instrument connected across said resistance means, a low resistance input circuit connected across said resistance means, and illuminating means for said cells controlled by said instrument.

6. A regenerative measuring system comprising a pair of photo-voltaic cells, means for connecting one pair of like terminals of said cells, fixed resistance means connected between the other pair of terminals of said cells, an electrical deflecting instrument and a high resistance input circuit connected in series across said resistance means, and illuminating means for said cells controlled by said instrument.

EDGAR D. DOYLE.
PAUL H. DIKE.